US006708583B2

(12) United States Patent
Palmer et al.

(10) Patent No.: US 6,708,583 B2
(45) Date of Patent: Mar. 23, 2004

(54) SHAFT SUPPORT STRUCTURE

(75) Inventors: Timothy A. Palmer, Moon Township, PA (US); Christopher T. Korson, Rochester, MI (US)

(73) Assignee: Bayer Polymers LLC, Pittsburgh, PA (US)

( * ) Notice: Subject to any disclaimer, the term of this patent is extended or adjusted under 35 U.S.C. 154(b) by 0 days.

(21) Appl. No.: 09/837,027

(22) Filed: Apr. 18, 2001

(65) Prior Publication Data

US 2002/0152829 A1 Oct. 24, 2002

(51) Int. Cl.7 ................................................. B62D 1/16
(52) U.S. Cl. ........................................ 74/492; 280/777
(58) Field of Search ..................... 74/493, 492; 280/777, 280/779, 780; 248/903; 180/78

(56) References Cited

U.S. PATENT DOCUMENTS

| | | | |
|---|---|---|---|
| 4,411,331 A | 10/1983 | Hanada ........................ 180/78 |
| 4,703,669 A | 11/1987 | Hyodo ......................... 74/492 |
| 5,174,421 A | * 12/1992 | Rink et al. ................... 188/374 |
| 5,180,189 A | * 1/1993 | Moreno ....................... 280/779 |
| 5,190,803 A | 3/1993 | Goldbach et al. ............ 428/138 |
| 5,605,352 A | * 2/1997 | Riefe et al. .................. 280/777 |
| 5,709,605 A | 1/1998 | Riefe et al. .................. 464/83 |
| 5,813,288 A | 9/1998 | Simonetti ..................... 74/492 |
| 5,820,163 A | * 10/1998 | Thacker et al. .............. 280/775 |
| 5,842,265 A | 12/1998 | Rink ........................... 29/460 |
| 5,940,949 A | 8/1999 | Rink ........................... 29/33 K |
| 5,941,129 A | * 8/1999 | Anspaugh et al. ............ 74/493 |
| 5,944,348 A | 8/1999 | Boyle, III et al. ........... 280/777 |
| 5,946,977 A | 9/1999 | Sato et al. .................... 74/492 |
| 5,975,766 A | 11/1999 | Cau ............................ 384/538 |
| 5,979,860 A | 11/1999 | Jurik et al. .................. 248/548 |
| 6,027,088 A | 2/2000 | Stedman et al. ............. 248/200 |
| 6,116,647 A | 9/2000 | Fischer et al. ............... 280/777 |
| 6,131,481 A | 10/2000 | Wilson et al. ................ 74/493 |
| 6,148,687 A | 11/2000 | Kurita ......................... 74/492 |
| 6,151,982 A | 11/2000 | Matsumoto et al. .......... 74/493 |
| 6,152,488 A | 11/2000 | Hedderly et al. ............ 280/775 |
| 6,152,489 A | 11/2000 | Hedderly et al. ............ 280/779 |
| 6,170,874 B1 | 1/2001 | Fosse .......................... 280/777 |
| 6,273,496 B1 | * 8/2001 | Guyomard et al. .......... 296/194 |
| 6,412,855 B1 | * 7/2002 | Cantineau et al. ........... 296/194 |

FOREIGN PATENT DOCUMENTS

| | | | |
|---|---|---|---|
| EP | 995668 | 10/1999 | |
| EP | 0 995 668 | 4/2000 | |
| WO | WO 18635 A1 | * 4/2000 | ........... B62D/25/08 |
| WO | 02/053445 | 7/2002 | |

OTHER PUBLICATIONS

Patent Abstracts of Japan, vol. 2000, No. 11, Jan. 3, 2001 & JP 2000 233757 A (Tokai Rika Co Ltd), Aug. 29, 2000.

* cited by examiner

Primary Examiner—David Fenstermacher
(74) Attorney, Agent, or Firm—Joseph C. Gil; James R. Franks

(57) ABSTRACT

Described is a shaft support structure (2) comprising, (a) an elongated shell (11) having interior surfaces (14) which define a hollow interior (17); and (b) a plurality of reinforcing ribs (20) of plastic material located within the hollow interior (17) of the shell (11). At least a portion of the reinforcing ribs (20) are in abutting relationship (23) with the interior surfaces (14) of the shell (11). The reinforcing ribs (20) define a longitudinal passage (41) through the elongated shell (11) for receiving and supporting a rotatable shaft (47). The reinforcing ribs (20) are fixedly attached to the elongated shell (11). The reinforcing ribs (20) are preferably formed by molding, e.g., injection molding, of plastic material onto the interior surfaces (14) of the elongated shell (11).

17 Claims, 4 Drawing Sheets

SHAFT SUPPORT STRUCTURE

DESCRIPTION OF THE INVENTION

The present invention relates to a shaft support structure, which includes an elongated shell having a hollow interior, and a plurality of reinforcing ribs of plastic material located within the hollow interior of the shell. The reinforcing ribs are fixedly attached to the shell, and define a longitudinal passage through the shell for receiving and supporting a rotatable shaft, e.g., a steering shaft, therein.

Rotatable shafts, such as automotive steering shafts and actuating shafts used in aircraft, typically must be supported along at least a portion of their length. Support of a rotatable shaft is generally necessary for reasons which include, stabilization of the shaft, e.g., minimizing flexing of the shaft during operation, lessening or minimizing the support load requirements on that which drives the shaft and that which is driven by the shaft, and protecting the shaft from damage.

In, for example, the transportation industry (e.g., the automotive and aircraft industries) it is desirable to minimize the weight of the vehicle or aircraft in an effort towards maximizing fuel efficiency. The total weight of a vehicle or aircraft can be reduced by reducing the weight of its components. However, it is generally required that the strength and rigidity of a component not be compromised as the weight of the component is reduced.

It is known that a component having a unitary molded plastic structure, formed for example by injection molding, can have reduced weight relative to an equivalent component fabricated from metal.

However, unitary molded plastic parts typically have lower strength and rigidity compared to equivalent parts fabricated from metal.

It would be desirable to develop a shaft support structure that has reduced weight. It is also desirable that the shaft support structure have, in addition to reduced weight, good strength and rigidity.

U.S. Pat. No. 5,190,803 describes a lightweight structural component having high strength and rigidity, which includes a bowl-shaped shell, e.g., fabricated from metal, and injected-on plastic reinforcing ribs located within the interior of the shell. The plastic reinforcing ribs are described in the '803 patent as being connected to the shell at discrete connecting points by means of perforations in the shell through which the plastic extends and in which the edges of the perforations are embedded. The '803 patent does not describe structural components that support internally a separate component passing through the interior of the structural component.

In accordance with the present invention, there is provided a shaft support structure comprising:

(a) an elongated shell having interior surfaces which define a hollow interior; and (b) a plurality of reinforcing ribs of plastic material located within the hollow interior of said shell, at least a portion of said reinforcing ribs being in abutting relationship with the interior surfaces of said shell, said reinforcing ribs defining a longitudinal passage through said elongated shell for receiving and supporting a rotatable shaft, and said reinforcing ribs being fixedly attached to said elongated shell.

In further accordance with the present invention, the shaft support structure comprises:

(a) an elongated shell having interior surfaces which define a hollow interior, said shell having a plurality of perforations having edges; and (b) a plurality of reinforcing ribs of plastic material located within the hollow interior of said shell, at least a portion of said reinforcing ribs being in abutting relationship with the interior surfaces of said shell, said reinforcing ribs defining a longitudinal passage through said elongated shell for receiving and supporting a rotatable shaft, wherein said reinforcing ribs are formed by molding, e.g., injection molding, of plastic material onto the interior surfaces of said shell, and a portion of the plastic material of said reinforcing ribs extends through at least some of said perforations of said shell, the edges of said perforations being embedded in the plastic material extending therethrough, thereby attaching fixedly said reinforcing ribs to said shell.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions, such as those expressing structural dimensions, quantities of ingredients, etc. used in the specification and claims are understood as modified in all instances by the term "about."

BRIEF DESCRIPTION OF THE DRAWINGS

In FIGS. 1 through 6, like reference numerals designate the same components and structural features.

DESCRIPTION OF THE INVENTION

Figure 1:
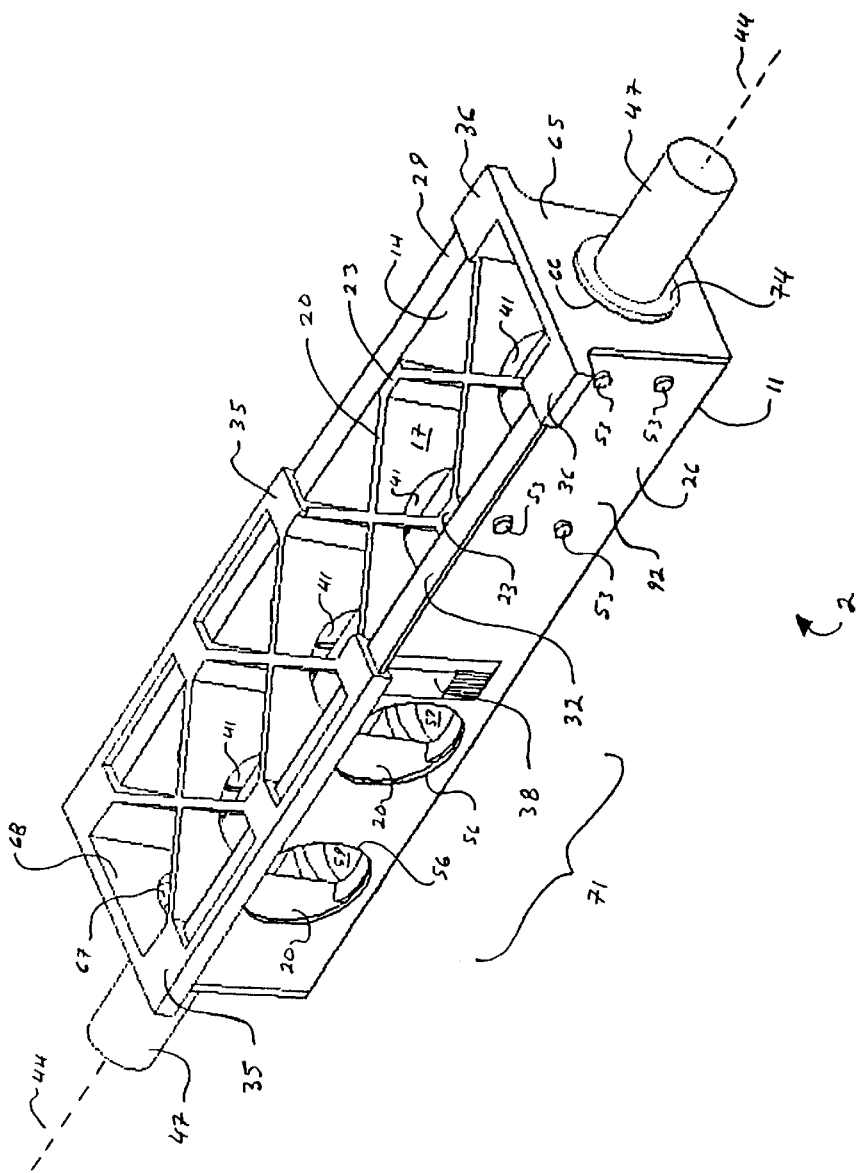
FIG. 1 is a perspective view of a shaft support structure according to the present invention.
Figure 2:
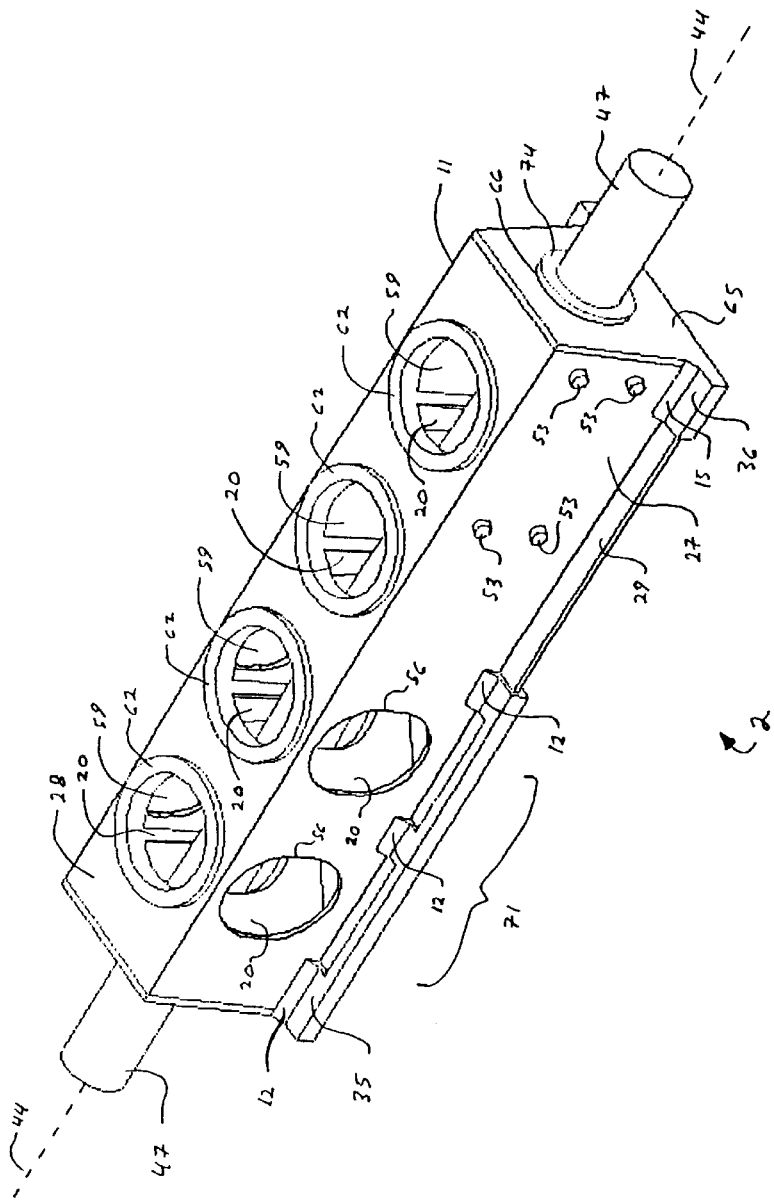
FIG. 2 is a perspective view of the shaft support structure of FIG. 1, in which the shaft support structure has been rotated 180° around its longitudinal axis.

Referring now to FIGS. 1 and 2 of the drawings, there is shown shaft support structure 2 according to the present invention, which includes an elongated shell 11 having substantially opposing sidewalls 26 and 27, and base 28. Elongated shell 11 has interior surfaces 14 which define a hollow interior 17. More specifically, it is the interior surfaces of sidewalls 26, 27 and base 28 that define hollow interior 17. A plurality of reinforcing ribs 20 are located within the hollow interior 17 of elongated shell 11. A portion 23 of reinforcing ribs 20 abuts interior surfaces 14 of elongated shell 11 (i.e., reinforcing ribs 20 are not continuous with shell 111). Reinforcing ribs 20 define a longitudinal passage 41, having a longitudinal axis 44, through interior 17 of elongated shell 11.

Reinforcing ribs 20 are depicted in FIG. 1 as having an X-like configuration. It is to be understood that the scope of the present invention is inclusive of other configurations, e.g., curved or arc configurations and/or parallel configurations. In an embodiment of the present invention, reinforcing ribs 20 form of a series of parallel ribs, which abut internal surfaces 14 of shell 11, and which have an open U-shaped configuration (not shown). The open portion of the U-shaped configuration of the reinforcing ribs is opposite of base 28, and defines an open longitudinal passage (not shown) through the interior of the elongated shell of the shaft support structure.

Shaft support structure 2 also includes a first plastic reinforcing end plate 65 having an aperture 66 therein, and a second plastic reinforcing end plate 68 having an aperture 67 therein. Apertures 66 and 67 are substantially axially aligned with and serve to further define longitudinal passage 41. End plates 65 and 68 are substantially opposed one from the other, and at least a portion of each abuts interior surfaces 14 of elongated shell 11.

A rotatable shaft 47 is received in longitudinal passage 41. Shaft 47 may be rotatably supported within longitudinal passage 41 by at least one of: (i) the reinforcing ribs 20; (ii) bushings, e.g., plastic bushings, (not shown); and (iii) rolling bearing means. Aperture 66 of first end plate 65 has rolling bearing means 74 therein, which rotatably supports shaft 47. Shaft support structure 2 may include additional rolling bearing means 74, e.g., within longitudinal passage 41 and aperture 67 of second end plate 68. Rolling bearing means that may be used in the present invention include those that are known to the skilled artisan, and typically include a housing, e.g., a plastic housing, and metal ball bearings (not shown) which engage rotatably with shaft 47.

Elongated shell 11 of shaft support structure 2 may be fabricated from materials selected from metal, thermoset plastic material, thermoplastic material and combinations thereof. In a preferred embodiment of the present invention, elongated shell 11 is fabricated from metal. Metals from which shell 11 may be fabricated include, but are not limited to, ferrous alloys, aluminum alloys and titanium alloys.

As used herein and in the claims the term "thermoset plastic material" means plastic materials having a three dimensional cross-linked network resulting from the formation of covalent bonds between chemically reactive groups, e.g., active hydrogen groups and free isocyanate groups. Thermoset plastic materials from which elongated shell 11 may be fabricated include those known to the skilled artisan, e.g., cross-linked polyurethanes, crosslinked polyepoxides and crosslinked polyesters. Of the thermoset plastic materials, crosslinked polyurethanes are preferred. Shell 11 may be fabricated from crosslinked polyurethanes by the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components. Upon complete reaction of the injected components, the mold is opened and the molded article, e.g., shell 11, is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which elongated shell 11 may be fabricated include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and mixtures or thermoplastic compositions containing one or more thereof. Of the thermoplastic materials from which shell 11 may be fabricated, thermoplastic polyamides are preferred. Shell 11 may be fabricated from thermoplastic materials by the art-recognized process of injection molding, in which a molten stream of thermoplastic material, e.g., molten thermoplastic polyamide, is injected into a mold, e.g., an optionally heated mold. Upon cooling the filled mold, the molded article, e.g., shell 11, is removed. A preferred thermoplastic material from which shell 11 may be fabricated is thermoplastic polyamide, e.g., DURETHAN thermoplastic polyamide, commercially available from Bayer Corporation.

The thermoset plastic materials and/or thermoplastic materials from which shell 11 may be fabricated, may optionally be reinforced with a material selected from glass fibers, carbon fibers, boron fibers metal fibers and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials of elongated shell 11 in a reinforcing amount, e.g., in an amount of from 5 percent by weight to 60 percent by weight, based on the total weight of shell 11.

The plastic material of reinforcing ribs 20 of shaft support structure 2 may be selected from thermoset plastic materials, thermoplastic materials and combinations thereof. The thermoset plastic materials from which reinforcing ribs 20 may be fabricated include those described previously herein, e.g., crosslinked polyurethanes. In a preferred embodiment of the present invention, the plastic of reinforcing ribs 20 is a thermoplastic material selected from thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and mixtures or thermoplastic compositions containing one or more thereof. A preferred thermoplastic material from which reinforcing ribs 20 may be fabricated is thermoplastic polyamide, e.g., DURETHAN thermoplastic polyamide, commercially available from Bayer Corporation.

Plastic reinforcing ribs 20 of shaft support structure 2 may optionally be reinforced with a material selected from glass fibers, carbon fibers, boron fibers, metal fibers and mixtures thereof. The reinforcing fibers, as described previously herein, may be surface treated, e.g., with sizings, prior to incorporation into the plastic material of the reinforcing ribs. A preferred reinforcing material for use in the reinforcing ribs of the present invention are glass fibers. If used, the reinforcement material, e.g., glass fibers, is typically present in the thermoset plastic materials and/or thermoplastic materials of ribs 20 in a reinforcing amount, e.g., in an amount of from 5 percent by weight to 60 percent by weight, based on the total weight of ribs 20.

The plastic materials of shell 11 and reinforcing ribs 20 may each independently further contain one or more functional additives other than or in addition to reinforcing materials. Additives that may be present in the plastic material of the shell and/or the reinforcing ribs of the shaft support structure include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material of the shell and/or the reinforcing ribs in functionally sufficient amounts, e.g., in amounts independently from 0.1 percent by weight to 10 percent by weight, based on the total weight of the plastic material of shell 11 or ribs 20.

The reinforcing ribs of the shaft support structure are prepared by the art recognized processes of reaction injection molding (in the case of thermoset plastic materials), and injection molding (in the case of thermoplastic materials, as described previously herein. In a preferred embodiment of the present invention, reinforcing ribs 20 form a continuous unitary structure within the hollow interior 17 of shell 11. Reinforcing ribs 20 having a continuous unitary structure are typically formed in a single mold. Reinforcing ribs 20 may be molded into a continuous unitary structure which is then inserted into hollow interior 17 and attached to shell 11. Alternatively, reinforcing ribs 20 may be formed into a continuous unitary structure by molding of plastic material directly onto interior surfaces 14 of shell 11, as will be described in further detail herein. In a particularly preferred embodiment of the present invention, reinforcing ribs 20 with first reinforcing end plate 65 and second reinforcing end plate 68 together form a continuous unitary structure within the hollow interior 17 of shell 11.

Reinforcing ribs 20 may be fixedly attached to shell 11 by attachment means selected from fasteners, adhesives, snap connections and combinations thereof. Examples of fasteners that may be used in the present invention include, but are not limited to, screws, e.g., sheet metal screws, nuts and bolts, and metal rivets. Adhesives that may be used include those that are known to the skilled artisan, e.g., epoxy resin based adhesives. Snap connections are typically formed by pushing the enlarged rounded head of a cylindrical extension (not shown), extending outwardly from abutting portions 23 of reinforcing ribs 20, through a matched flexible perforation in shell 11 (not shown). The rounded head of the cylindrical extension has a diameter greater than that of the matched perforation, and the cylindrical shaft of the extension has a diameter that is typically equivalent to the diameter of the perforation. Upon pushing the enlarged rounded head of the extension through the matched perforation, the perforation closes back around the shaft of the extension, thus fixedly attaching reinforcing ribs 20 to shell 11.

In a particularly preferred embodiment of the present invention, the elongated shell of the shaft support structure has a plurality of perforations having edges. Reinforcing ribs 20 are preferably formed by injection molding of plastic material onto the interior surfaces 14 of elongated shell 11, and a portion of the plastic material of reinforcing ribs 20 extends through at least some of the perforations of shell 11 (as represented by attachment heads 53 in FIGS. 1 and 2). The edges of the perforations are embedded in the plastic material extending therethrough, thereby fixedly attaching reinforcing ribs 20 to shell 11.

Figure 3:
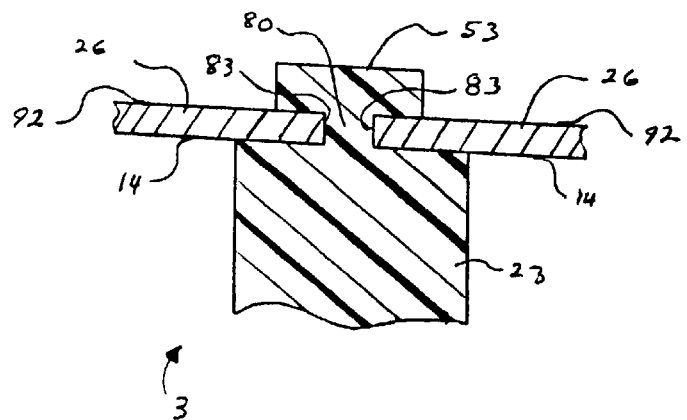
FIG. 3 is a sectional representation of perforation edges embedded in the plastic material extending therethrough.
Figure 5:
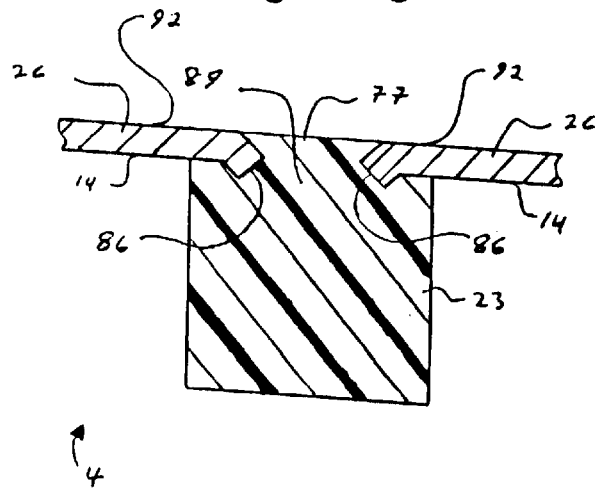
FIG. 5 is a sectional representation of deformed perforation edges embedded in the plastic material extending therethrough.
Figure 6:
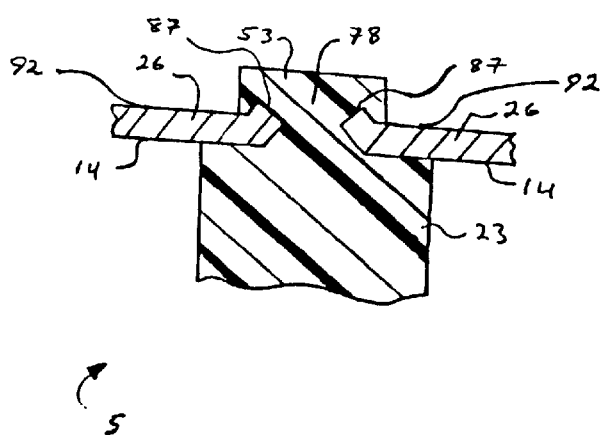
FIG. 6 is a sectional representation of deformed perforation edges embedded in the plastic material extending therethrough.

Sectional representations of attachment points or elements formed by the passage of injected on plastic through perforations in elongated shell 11 are depicted in FIGS. 3, 5 and 6. Attachment element 3 of FIG. 3 comprises portion 23 of reinforcing ribs 20 which abuts interior surface 14 of sidewall 26 of shell 11. A portion of the plastic material of abutting portion 23 extends through perforation 80 of sidewall 26, is continuous with attachment head 53, and embeds edge portions 83 of perforation 80 in the plastic material extending therethrough. Perforations 80 of sidewall 26 may have any desired configuration, e.g., round, square, rectangular, ellipsoid or slotted.

At least some of the perforations in the elongated shell of the shaft support structure may have deformed edges, which are embedded in the plastic material extending therethrough, in an embodiment of the present invention. The deformed edge portions of the perforation may be formed during or after formation of the perforation. When the shell is fabricated from plastic materials, the deformed edges of the perforations may be formed during molding of the shell. When the shell is fabricated from metal, the deformed edges of the perforations are typically formed by means of metal fabricating techniques, such as metal punches, as is known to the skilled artisan.

Referring to FIG. 5, attachment element 4 comprises abutting portion 23 of reinforcing ribs 20, which extends through perforation 89 of sidewall 26 and is continuous with attachment head 77 (which is substantially flush with the exterior surface 92 of sidewall 26). Perforation 89 has deformed edge portions 86, which are embedded in the plastic material extending therethrough. The deformed edge portions 86 of perforation 89 are directed inward towards the hollow interior 17 of shell 11. Perforations having deformed edge portions, such as perforation 89, may have any desired configuration, e.g., round, square, rectangular, ellipsoid or slotted.

Attachment element 5 of FIG. 6 comprises abutting portion 23 of reinforcing ribs 20, which extends through perforation 78 of sidewall 26 and is continuous with attachment head 53. Perforation 78 has deformed edge portions 87, which are embedded in the plastic material extending therethrough. The deformed edge portions 87 of perforation 78 are directed outward, away from the hollow interior 17 of shell 11.

Figure 4:
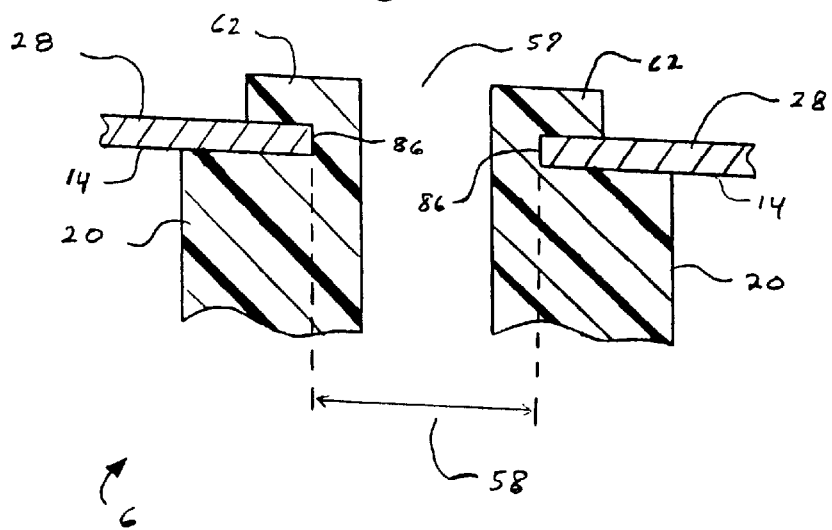
FIG. 4 is a sectional representation of plastic embedded perforation edges, in which the plastic material defines a substantially plastic lined aperture.

In an embodiment of the present invention, the plastic material extending through the perforations and embedding the edges of the perforations, also defines a substantially plastic lined aperture in the elongated shell of the shaft support structure. The plastic lined aperture may be of any desired shape, e.g., circular, ellipsoid, square, rectangular or slotted. With reference to FIG. 2, apertures 59 in base 28 of shell 11 are lined with plastic material extending from reinforcing ribs 20 to open attachment heads 62. With reference to FIG. 4, attachment element 6 comprises plastic reinforced ribs 20 which extend through original aperture 58 in base 28 and are continuous with open attachment head 62. Original aperture 58 has edge portions 86 that are embedded in the plastic material extending therethrough. The plastic material extending through original aperture 58 defines plastic lined aperture 59.

The process of injecting thermoplastic material, or reaction injection of thermoset plastic materials onto the interior surfaces of the elongated shell of the shaft support structure involves using the shell as a portion of the mold in which the reinforcing ribs are formed. Plastic materials that are molded onto the interior and/or onto the exterior surfaces of the elongated shell are referred to herein and in the claims as "molded on plastic materials" and similar terms.

With reference to FIG. 1, typically, a first mold portion (not shown) is inserted down into the hollow interior 17 in abutting relationship with interior surfaces 14 of shell 11. The inserted first mold portion and interior surfaces 14 of shell 11 together define a continuous cavity into which molten thermoplastic material, is injected to form reinforcing ribs 20, and reinforcing end plates 65 and 68. Optionally, second mold portions (not shown) may be placed in abutting relationship with the exterior of shell 11 and over the perforations in shell 11 to form attachment heads 53.

The longitudinal passage of the shaft support structure is preferably formed concurrently with the mold formation of the reinforcing ribs. With reference to FIGS. 1, 2 and 4, this may be achieved by further inserting third mold portions (not shown) into interior 17 through apertures 58 (depicted in FIG. 4 and discussed previously herein) in base 28 of shell 11. The first mold portion inserted down into interior 17, the third mold portions inserted into interior 17 through apertures 58, and interior surfaces 14 of shell 11 together define: (i) a continuous cavity into which plastic material, e.g., molten thermoplastic material, is injected to form reinforcing ribs 20; and (ii) excluded cavities (into which injected plastic material does not invade) which serve to form or define longitudinal passage 41.

In an embodiment of the present invention, at least a portion of the interior and/or exterior surfaces of the elongated shell of the shaft support structure are covered with a layer of molded on plastic material, e.g., a thermoset plastic material and/or a thermoplastic material, preferably a thermoplastic material, such as thermoplastic polyamide. A covering of molded on plastic material can serve to protect the elongated shell, for example, from corrosion, in the case when the shell is fabricated from metal.

In a further embodiment of the present invention, a portion of the exterior surface of the elongated shell of the shaft support structure is covered with exterior molded on plastic material that is continuous with the reinforcing ribs, and which serves to further fixedly attach the ribs to the shell (in addition to the molded on plastic material extending through perforations in the shell). With further reference to FIGS. 1 and 2, sidewalls 26 and 27 of shell 11 each have laterally outwardly extending flanges 32 and 29, respectively. Plastic material extends over and around each of flanges 29 and 32 (as represented by attachment elements 35 and 36 in FIGS. 1 and 2). The plastic material of attachment elements 35 and 36 may be continuous with reinforcing ribs 20, end plate 65 and end plate 68, and serves to further fixedly attach reinforcing ribs 20 along with reinforcing end plates 65 and 68 to elongated shell 11. With further reference to FIG. 2, attachment elements 35 and 36 wrap around flange 29 and abut the exterior of sidewall 27 by means of abutting foot portions 12 and 15, respectively.

When the reinforcing ribs are fixedly attached to the shell of the shaft support structure by means of molded on plastic extending through perforations in the shell, additional attachment means may be used. Such additional optional attachment means may be selected from fasteners, adhesives, snap connections and combinations thereof (as described previously herein).

When the shaft support structure of the present invention includes at least one rolling bearing means, the rolling bearing means may be supported within the longitudinal passage by a plastic boss. Preferably, the plastic boss is continuous with the reinforcing ribs. The plastic boss is further preferably formed concurrently with the formation of the reinforcing ribs by molding, e.g., injection molding, of plastic material onto the interior surfaces of the shell. The plastic boss is typically in the form of a plastic tubular sleeve into which the rolling bearing means, e.g., rolling bearing means 74 of shaft support structure 2 of FIGS. 1 and 2, is inserted.

The shaft support structure of the present invention may be used to support a wide range of rotatable shafts, e.g., drive shafts, screw shafts and steering shafts. In an embodiment of the present invention, the shaft support structure is a steering column, e.g., for use in an automobile, and the shaft supported therein is a rotatable steering shaft. When used as a steering column, shaft support structure 2 of FIGS. 1 and 2 would typically be fastened, e.g., by means of a bracket (not shown), to a support structure, e.g., a cross car beam, within the passenger compartment of an automobile (not shown). One end of shaft 47, e.g., the end extending out from end plate 65, would be attached to a steering wheel (not shown), and the other end, e.g., the end extending out from end plate 68, would be attached to the steering mechanism of the front wheels of the automobile (not shown).

At least a portion of the shaft support structure may optionally be irreversibly longitudinally collapsible. This is particularly desirable when the shaft support structure is used as a steering column in an automobile. In the event that the automobile sustains a front end collision, it is preferred that the steering column collapse irreversibly forward along its longitudinal axis, to minimize impact between the steering wheel and the driver. The collapsible portion of the shaft support structure may, for example, include at least one of the following: thinner shell wall sections; slotted or perforated shell wall sections; reticulated or accordion-like shell wall sections; thinner plastic reinforcing ribs; and plastic reinforcing ribs that do not contain reinforcing materials, such as glass fibers.

Shaft support structure 2 of FIGS. 1 and 2 has an irreversibly longitudinally collapsible section 71. Collapsible portion 71 includes large apertures 56 in sidewalls 26 and 27 of shell 11. The large apertures 56 in sidewalls 26 and 27 serve to allow shaft support structure 2 to irreversibly collapse along its longitudinal axis 44, in response to a severe impact directed substantially along axis 44.

Steering columns in many automobiles are reversibly adjustable or tiltable along a vertical axis that is substantially perpendicular to the longitudinal axis of the steering column. Such a reversible tilt adjustment allows the driver to position the steering wheel for improved ease of operation. Tilt adjustment of a steering column typically involves operating a separate mechanism, e.g., a rake adjustment mechanism, that abuts an exterior portion of the steering column, as is known to the skilled artisan. A rake adjustment plate is typically located on the exterior portion of the steering column that abuts the rake adjustment mechanism. The rake adjustment plate may be grooved to allow graduated tilt adjustment of the steering column.

In an embodiment of the present invention, and with reference to FIG. 1, the steering column support structure 2 is a steering column and has a plastic rake adjustment plate 38 fixed to the exterior of sidewall 26 of shell 11. Rake adjustment plate 38 may be fixedly attached to the exterior of sidewall 26 by attachment means selected from fasteners, adhesives, snap connections and combinations thereof (not shown). Preferably, rake adjustment plate 38 is formed by molding, e.g., injection molding, of plastic material onto the exterior surface of sidewall 26 of shell 11. A portion of the molded on plastic material of rake adjustment plate 38 extends through perforations in sidewall 26 (not shown), and embeds the edges of the perforations in the plastic, thereby fixedly attaching rake adjustment plate 38 to sidewall 26. The plastic material of rake adjustment plate 38, which fixedly extends through perforations in sidewall 26, may optionally be continuous with reinforcing ribs 20. Rake adjustment plate 38 may be molded on to sidewall 26 either prior to, concurrently with, or after the molded on formation of ribs 20 on interior surfaces 14 of shell 11.

The present invention has been described with reference to specific details of particular embodiments thereof. It is not intended that such details be regarded as limitations upon the scope of the invention except insofar as and to the extent that they are include in the accompanying claims.

What is claimed is:

1. A shaft support structure comprising:
   (a) an elongated shell having interior surfaces which define a hollow interior, said shell having a plurality of perforations having edges; and
   (b) a plurality of reinforcing ribs of plastic material located within the hollow interior of said shell, at least a portion of said reinforcing ribs being in abutting relationship with the interior surfaces of said shell, said reinforcing ribs defining a longitudinal passage through said elongated shell for receiving and supporting a rotatable shaft,
wherein said reinforcing ribs are formed by molding of plastic material onto the interior surfaces of said shell, and a portion of the plastic material of said reinforcing ribs extends through at least some of said perforations of said shell, the edges of said perforations being embedded in the plastic material extending therethrough, thereby attaching fixedly said reinforcing ribs to said shell.

2. The shaft support structure of claim 1 wherein said shell is fabricated from a material selected from metal, thermoset plastic material, thermoplastic material and combinations thereof.

3. The shaft support structure of claim 2 wherein said shell is fabricated from metal.

4. The shaft support structure of claim 1 wherein at least a portion of at least one of the interior surfaces and exterior surfaces of said shell are covered with a layer of molded on plastic material.

5. The shaft support structure of claim 4 wherein at least a portion of the exterior surface of said shell is covered with exterior molded on plastic material, the exterior molded on plastic material is continuous with the plastic material of said reinforcing ribs, and further fixedly attaches said ribs to said shell.

6. The shaft support structure of claim 1 wherein the plastic material extending through and embedding said edges of said perforations defines substantially plastic lined apertures in said elongated shell.

7. The shaft support structure of claim 1 wherein said reinforcing ribs are further fixedly attached to said shell by attachment means selected from fasteners, adhesives, snap connections and combinations thereof.

8. The shaft support structure of claim 1 wherein the plastic material of said reinforcing ribs is selected from thermoset plastic materials, thermoplastic materials and combinations thereof.

9. The shaft support structure of claim 8 wherein the plastic material of said reinforcing ribs is a thermoplastic material selected from thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and thermoplastic compositions containing one or more thereof.

10. The shaft support structure of claim 1 wherein said plastic material of said reinforcing ribs is reinforced with a material selected from glass fibers, carbon fibers, boron fibers, metal fibers and mixtures thereof.

11. The shaft support structure of claim 1 wherein said reinforcing ribs form a continuous unitary structure within the hollow interior of said elongated shell.

12. The shaft support structure of claim 1 wherein at least some of said perforations have deformed edge portions, and said deformed edge portions are embedded in the plastic material extending therethrough.

13. The shaft support structure of claim 1 further comprising within said longitudinal passage at least one rolling bearing means for rotatably supporting said shaft.

14. The shaft support structure of claim 13 wherein said rolling bearing means is supported within said longitudinal passage by a plastic boss, said plastic boss being continuous with said reinforcing ribs and being formed concurrently with the formation of said reinforcing ribs by molding of plastic material onto the interior surfaces of said shell.

15. The support shaft structure of claim 1 wherein said support shaft structure is a steering column and said rotatable shaft is a rotatable steering shaft.

16. The shaft support structure of claim 15 wherein at least a portion of said shaft support structure is irreversibly longitudinally collapsible.

17. The shaft support structure of claim 16 further comprising a rake adjustment plate fixed to the exterior of a side wall of said shell, said rake adjustment plate comprising plastic material and being formed by molding of plastic material onto the exterior surface of said side wall of said shell.

* * * * *